United States Patent
Mickelsen

(10) Patent No.: US 6,527,636 B2
(45) Date of Patent: Mar. 4, 2003

(54) METHOD OF CUTTING RIBS

(75) Inventor: Darryl H. Mickelsen, Austin, MN (US)

(73) Assignee: Hormel Foods, LLC, Austin, MN (US)

( * ) Notice: Subject to any disclaimer, the term of this patent is extended or adjusted under 35 U.S.C. 154(b) by 0 days.

(21) Appl. No.: 09/874,935

(22) Filed: Jun. 5, 2001

(65) Prior Publication Data

US 2002/0127963 A1 Sep. 12, 2002

Related U.S. Application Data

(60) Provisional application No. 60/273,680, filed on Mar. 6, 2001.

(51) Int. Cl.$^7$ .............................................. A22C 18/00
(52) U.S. Cl. ....................................... 452/149; 452/135
(58) Field of Search ................................. 452/149, 135

(56) References Cited

U.S. PATENT DOCUMENTS

| | | | | |
|---|---|---|---|---|
| 4,628,569 A | * | 12/1986 | Gagliardi, Jr. | 452/149 |
| 5,464,368 A | | 11/1995 | White et al. | 452/149 |
| 5,525,103 A | | 6/1996 | White et al. | 452/149 |
| 6,248,012 B1 | * | 6/2001 | Folkmann | 452/135 |
| 6,280,311 B1 | * | 8/2001 | Kuck | 452/135 |

OTHER PUBLICATIONS

Merle Ellis, Have spareribs to spare Buy cheaper cut, stretch portions to make 2, Aug. 1, 1996, Times Publishing Company, The Chattanooga Times, column; p. D4.*
Joan Lang, Ribs, Bell & Howell Information and Learning, Restaurant Business, Jul. 15, 2001, vol. 100, No. 14; p. 81; ISSN: 00978043; Coden: Rsbsay.*
The Voice of Foodservice Distribution, The 'other white meat.' pork; Industry Overview, Bill Communications, Inc., vol. 31; No. 8; p. 69.*

* cited by examiner

Primary Examiner—Peter M. Poon
Assistant Examiner—Joan M. Olszewski
(74) Attorney, Agent, or Firm—IPLM Group, P.A.

(57) ABSTRACT

The present invention relates to a method of cutting ribs (10), and more specifically, a method of cutting larger ribs (10) to make at least two smaller ribs (14 and 15) of a more manageable size. The larger ribs (10) are cut by removing the brisket portion (12) at a point dorsal to the curvature of the costal cartilages, the rib tail portion (11), and the rib sections (13) from the shoulder end of the ribs (10). Then, after these portions have been removed from the ribs (10), the remaining whole spare rib portion (16) is further sectioned longitudinally to yield at least two shorter spare rib portions (14 and 15).

13 Claims, 2 Drawing Sheets

METHOD OF CUTTING RIBS

This application claims the benefit of U.S. Provisional Application No. 60/273,680, filed Mar. 6, 2001.

BACKGROUND OF THE INVENTION

1. Field of the Invention

The present invention relates to a method of cutting ribs, and more specifically, a method of cutting larger ribs to make at least two smaller ribs of a more manageable size.

2. Description of the Prior Art

According to the NPPC Pork Quality Standard, the quality of fresh pork varies greatly. The quality levels appear differently to consumers, taste differently when cooked, and perform differently when converted to processed products. High quality pork has greater monetary value than low quality pork, and the quality can be evaluated by simple visual appraisal. Therefore, it is important that pork appear to have a higher quality in order to have a higher monetary value.

Pork carcasses are typically butchered into several main cuts or sections including the loin, shoulder, ham, and belly sections. A loin section is that portion of a side of pork remaining after the shoulder, ham, belly and fatback have been removed. The loin section may also include the blade bone with its overlying flesh. Several individual cuts or portions may be taken from the loin section of the hog including bladeless loin, center cut loin, boneless loin, Canadian back, back ribs and country style ribs. The bladeless loin is the remaining portion of the loin section after the blade bone and related cartilage and overlying flesh have been removed. The center cut loin is prepared by removing the shoulder end and the ham end of the loin section to leave not more than eight ribs. Chops are typically prepared from the bladeless loin and the center cut loin by making cuts generally perpendicular to the longitudinal length of the loin.

Alternatively, the loin section may be used to prepare boneless loin, Canadian back, tenderloin, back ribs and country style ribs by cutting the loin section longitudinally from the shoulder end of the loin towards the ham end of the loin. The tenderloin is generally prepared by cutting the loin section longitudinally to remove the meat lying ventral to the back ribs towards the ham end of the loin. The remaining loin section includes the back ribs and the semispinalis muscle. The semispinalis muscle is generally the meaty tissue above the back ribs opposite the tenderloin. Boneless loin cuts and the back rib cuts are generally prepared by cutting or deboning the remaining loin sections between the semispinalis muscle and the back ribs, adjacent to the back ribs, to form the boneless loin cut and the back ribs cut. The boneless loin cut generally includes the entire semispinalis muscle separated from the back ribs. The boneless loin cut is typically further processed to provide Canadian bacon, boneless pork loin roast, boneless rolled and tied roasts or butterfly pork chops.

The back rib cut consists of rib bones and related intercostal meat. Each back rib section is intact and includes portions of at least ten ribs. Back rib cuts are generally sold as a single intact rib section which may be prepared and consumed with various sauces. Although the back rib cut is merely a by-product from deboning the loin section, the demand for the back rib cuts has increased dramatically in recent years due to the increase in demand for "finger food." However, because back rib cuts typically contain only intercostal meat between the rib bones, conventional back rib cuts do not include a substantial amount of meat. In addition, the intercostal meat is not easily accessible and is generally more difficult to consume. Consequently, conventional back rib cuts are difficult to consume and do not provide a substantial amount of meat or servings to meet the increased demand for the back rib cuts.

Pork spare ribs are further divided and sold as either St. Louis style spare ribs or breast bone spare ribs. St. Louis style spare ribs generally comprise the upper part of a rib separated from the breast bone or brisket bone by costal cartilage. St. Louis style ribs include the two ribs from the shoulder end and the brisket portion and is typically about 1¼ to 2¼ pounds. Because of the generally meatiness and minimal fat associated with the St. Louis style ribs, there is a greater demand for St. Louis style ribs that are consequently more profitable for food providers. However, a St. Louis style rib is often still too large and therefore less marketable to consumers.

The breast bone portion of the spare ribs removed from the St. Louis style spare ribs includes the sternum or hard bone, costal cartilage, soft bones, skirt meat, false lean hanging fat and other tissue. Typically, the breast bone portion is trimmed to remove the skirt meat containing small meaty pieces, otherwise known as rib tips. The remaining breast bone portion contains the hard bone, a large percentage of fat and the soft bones that infiltrate most of the breast bone portion. The soft bones, otherwise known as cartilage bones, are separated from one another by pork meat and tunnel fat. Consequently, trimming away any remaining meat from between the soft bones is difficult. As a result, the remaining breast bone portion is typically viewed as an off-fall product, and is not considered desirable by consumers or food producers and is sold at a much lower price.

It is generally desirable to have ribs including more meat and less fat but having a more manageable size for consumers.

SUMMARY OF THE INVENTION

In a preferred embodiment method of cutting a rib, a rib includes a brisket portion, a tail portion, and a shoulder end having two rib sections. The brisket portion is removed from the rib and the tail portion is removed from the rib thereby yielding a remaining rib portion. After the brisket portion and the tail portion have been removed from the rib, the remaining rib portion has a center dividing the remaining rib portion longitudinally. Finally, the remaining rib portion is sectioned longitudinally down the center thereby yielding two spare rib portions from the remaining rib portion.

In another preferred embodiment method of cutting a rib, a rib includes a brisket portion, a tail portion, and a shoulder end having two rib sections. The brisket portion is removed from the rib and the tail portion is removed from the rib thereby yielding a remaining rib portion. After the brisket portion and the tail portion have been removed from the rib, the remaining rib portion has a center dividing the remaining rib portion longitudinally. Then, the two rib sections on the shoulder end are removed from the remaining rib portion, and the remaining rib portion is sectioned longitudinally down the center thereby yielding two spare rib portions from the remaining rib portion. Finally, the two spare rib portions are sectioned laterally thereby yielding smaller sections of the two spare rib portions.

In another preferred embodiment method of cutting a rib, a rib includes a brisket portion, a tail portion, and a shoulder end having two rib sections. The brisket portion is removed from the rib and the tail portion is removed from the rib thereby yielding a remaining rib portion. After the brisket portion and the tail portion have been removed from the rib, the remaining rib portion has a center dividing the remaining rib portion longitudinally. Then, the two rib sections on the shoulder end are removed from the remaining rib portion, and the remaining rib portion is sectioned longitudinally down the center thereby yielding two spare rib portions from the remaining rib portion.

In another preferred embodiment method of cutting a rib, a rib includes a brisket portion, a tail portion, and a shoulder end having two rib sections. The brisket portion is removed from the rib and the tail portion is removed from the rib thereby yielding a remaining rib portion. After the brisket portion and the tail portion have been removed from the rib, the remaining rib portion has a center dividing the remaining rib portion longitudinally. Then, the remaining rib portion is sectioned longitudinally down the center thereby yielding two spare rib portions from the remaining rib portion. Finally, the two spare rib portions are sectioned laterally thereby yielding smaller sections of the two spare rib portions.

In a preferred embodiment method of cutting a rib, a rib includes a brisket portion, a tail portion, and a shoulder end having two rib sections. The brisket portion is removed from the rib and the tail portion is removed from the rib thereby yielding a remaining rib portion. Finally, the remaining rib portion is sectioned longitudinally thereby yielding at least two spare rib portions from the remaining rib portion.

DETAILED DESCRIPTION OF THE PREFERRED EMBODIMENT

The present invention relates to a method of cutting larger ribs longitudinally to make them into smaller ribs of a more manageable size. A preferred embodiment method according to the principles of the present invention utilizes a loin portion or whole spare rib designated by the numeral 10 in FIG. 1.

Figure 1:
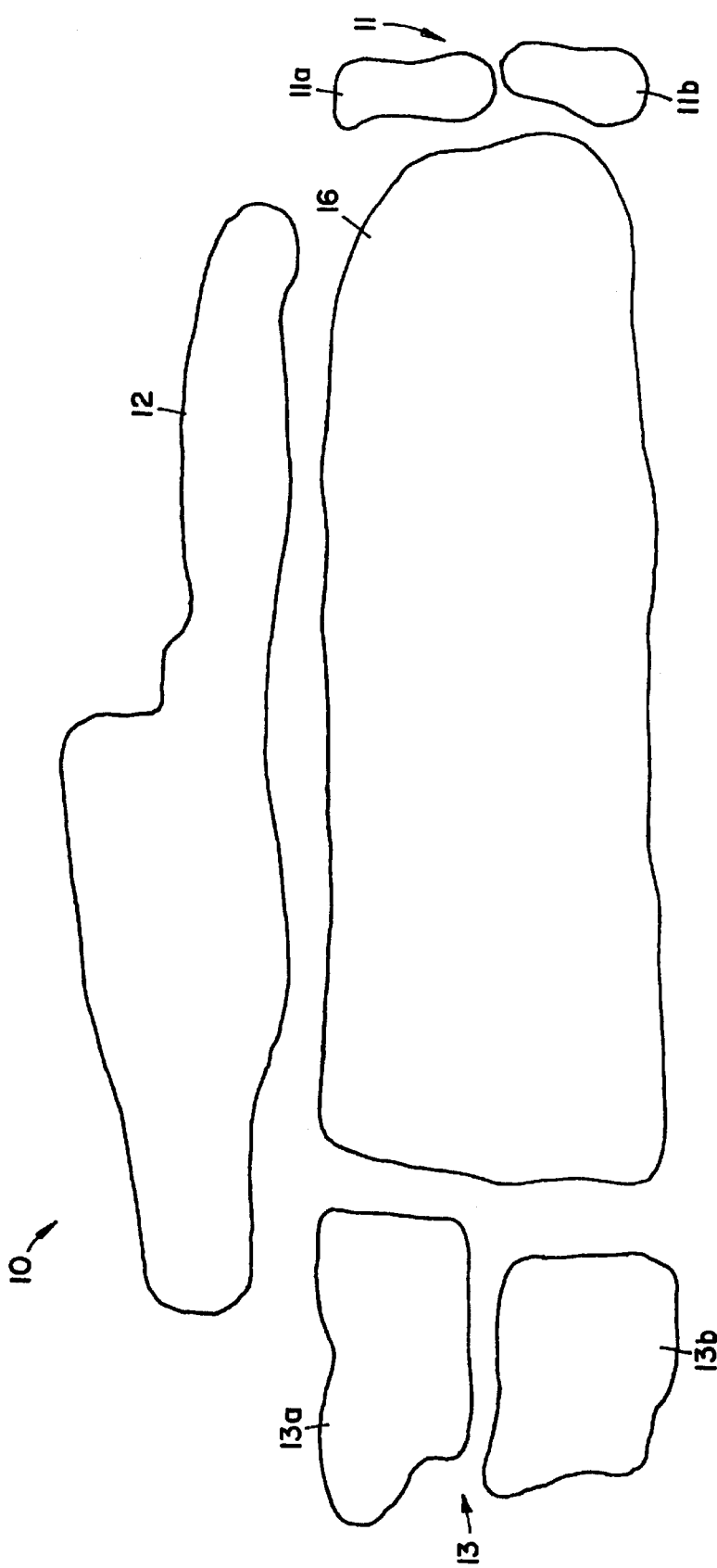
FIG. 1 is a top plan representation of a whole spare rib.
Figure 2:
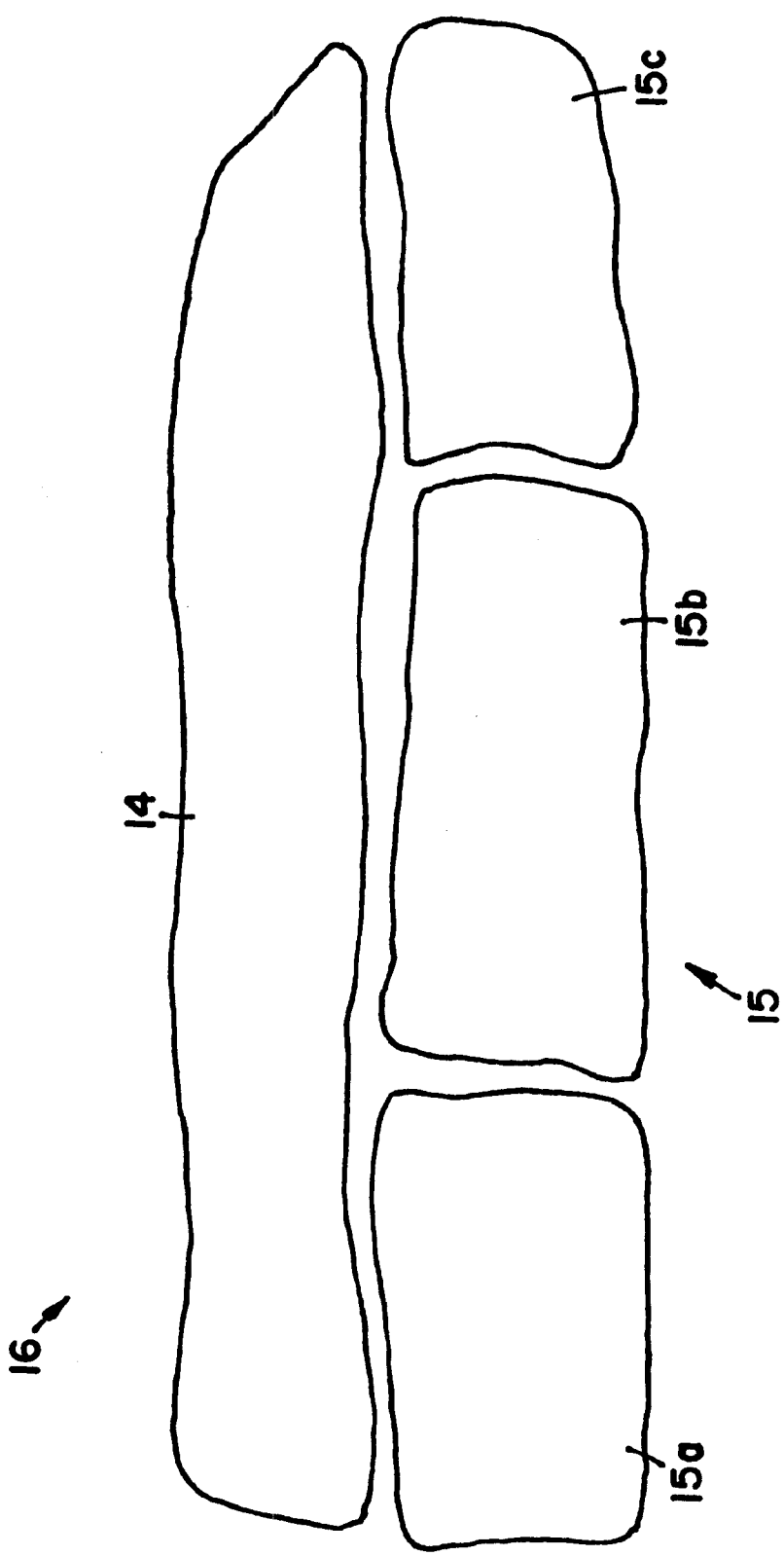
FIG. 2 is a top plan representation of a remaining rib portion of the whole spare rib in FIG. 1.

First, the loin portion or whole spare rib 10 is removed from the carcass, which is not shown. Then, the brisket portion 12 is removed from the whole spare rib 10 at a point dorsal to the curvature of the costal cartilages of the carcass, and the rib tail portions 11, further shown as 11a and 11b in FIG. 1, are removed from the whole spare rib 10. Also, the rib sections 13 may be removed from the shoulder end of the whole spare rib 10. Although the rib sections 13 are shown in FIG. 1 as being two rib sections 13a and 13b, this portion could also be removed from the whole spare rib 10 as one piece rather than as two separate pieces. The two rib sections 13a and 13b each include two rib bones from the shoulder end of the whole spare rib 10. These portions may be removed in any order. Then, after these portions have been removed, the remaining rib portion 16 has a center that divides the remaining rib portion 16 longitudinally. In the preferred embodiment, the remaining rib portion 16 is further sectioned longitudinally down the center to yield two shorter spare rib portions 14 and 15, resulting in the "center cut" rib, as shown in FIG. 2. The two shorter spare rib portions 14 and 15 are substantially equal in size having a range of 40–60%. The two shorter spare rib portions 14 and 15 may optionally be further sectioned laterally thereby yielding smaller sections of each of the two spare rib portions as shown in FIG. 2 as first piece 15a, second piece 15b, and third piece 15c of the second remaining rib portion 15. The first remaining rib portion 14 has not been further sectioned in FIG. 2. Therefore, because the remaining rib portion 16 is sectioned longitudinally down the center, this type of cut is referred to as a "center cut" rib. It is recognized that the remaining rib portion 16 may be sectioned longitudinally into more than two portions, i.e. into three or more sections. The present method may be used to section the remaining rib portion 16 into at least two shorter spare rib portions.

Typically the term "center cut" has been used to describe a product that has been removed from the center portion of a larger cut by means of transverse sectioning and removal of the end pieces. An example of this would be removing the blade and sirloin portions of the loin. In this case, however, the "center cut" represents the longitudinal cut down the center of the whole spare rib, resulting in two smaller width rib sections. More specifically, and as described above, the term "center cut" refers to removal of the following portions: the brisket portion 12 at a point dorsal to the curvature of the costal cartilages, the rib tail portions 11a and 11b, and the two rib sections 13a and 13b from the shoulder end. Then, the remaining rib portion 16 is further sectioned longitudinally down the center to yield two shorter spare rib sections 14 and 15, resulting in the "center cut" rib. Again, the two shorter spare rib sections 14 and 15 may optionally be further sectioned laterally thereby yielding smaller sections of each of the two spare rib portions. The "center cut" rib allows the ribs that were previously difficult to sell to be used because it addresses the portion control issues and is easier for the consumers to both prepare and to consume.

The heavier the rib is, the less expensive it is. By removing the two rib sections 13a and 13b from the shoulder end, the rib is upgraded because it has a uniform shape as a rectangle or a square. The removal of the two rib sections 13a and 13b square off the shoulder end. Also, by removing the end tail portions 11a and 11b from the rib, the rib is squared up at its flank end. In the preferred embodiment, the remaining rib portion 16 is approximately a 5½ inch portion and, therefore, the two shorter spare rib sections 14 and 15 are approximately 2¾ inch portions when a larger St. Louis style rib of approximately 3 pounds is used. These measurements refer to the length of the bone of the rib, and it is understood that these sizes are not necessary and may vary depending on the size of the rib being used. Again, the remaining rib portion 16 may be sectioned into at least two spare rib portions.

Benefits of using this method include the ribs will cook faster, the ribs are easier to eat, and the portions can be controlled more easily. Also, the larger ribs are typically not as marketable as spare ribs because they are too big. Therefore, by sectioning them longitudinally, at least two ribs are made having more meat but having a more manageable size, which thereby makes them more marketable.

The above specification, examples and data provide a complete description of the manufacture and use of the composition of the invention. Since many embodiments of the invention can be made without departing from the spirit and scope of the invention, the invention resides in the claims hereinafter appended.

I claim:

1. (Amended) A method of cutting a spare rib, comprising:

a. taking a spare rib, said spare rib having a brisket portion, a tail portion, and a shoulder end having two rib sections;

b. removing the brisket portion from the spare rib;

c. removing the tail portion from the spare rib Thereby yielding a remaining rib portion after the brisket portion and the tail portion have been removed from the spare rib, the remaining rib portion having a center, the center dividing the remaining rib portion longitudinally; and d. sectioning the remaining rib portion longitudinally down the center thereby yielding two spare rib portions from the remaining rib portion.

2. The method of claim 1, further comprising removing the two rib sections on the shoulder end from the remaining rib portion.

3. The method of claim 1, further comprising sectioning the two spare rib portions laterally thereby yielding smaller sections of the two spare rib portions.

4. The method of claim 1, wherein the two spare rib portions are substantially equal in size.

5. A method of cutting a spare rib, comprising:

a. taking a spare rib, said spare rib having a brisket portion, a tall portion, and a shoulder end having two rib sections;

b. removing the brisket portion from the spare fib;

c. removing the tail portion from the spare rib thereby yielding a remaining rib portion after the brisket portion and the tail portion have been removed from the spare rib, the remaining rib portion having a center, said center dividing the remaining fib portion longitudinally;

d. removing the two rib sections on the shoulder end from the remaining rib portion;

e. sectioning the remaining rib portion longitudinally down the center thereby yielding two spare fib portions from the remaining rib portion; and f. sectioning the two spare rib portions laterally thereby yielding smaller sections of the two spare rib portions.

6. A method of cutting a spare rib, comprising:

a. taking a spare rib, said spare rib having a brisket portion, a tail portion, and a shoulder end having two rib sections;

b. removing the brisket portion from the spare fib;

c. removing the tail portion from the spare rib thereby yielding a remaining rib portion after the brisket portion and the tail portion have been removed from the spare rib, the remaining rib portion having a center, said center dividing the remaining rib portion longitudinally;

d. removing the two rib sections on the shoulder end from the remaining fib portion; and e. sectioning the remaining rib portion longitudinally down the center thereby yielding two spare rib portions from the remaining rib portion.

7. The method of claim 6, further comprising sectioning the two spare rib portions laterally thereby yielding smaller sections of the two spare rib portions.

8. A method of cutting a spare rib, comprising:

a. taking a spare rib, said spare rib having a brisket portion a tail portion, and a shoulder end having two rib sections;

b. removing the brisket portion from the spare rib;

c. removing the tail portion from the spare rib thereby yielding a remaining rib portion after the brisket portion and the tail portion have been removed from the spare rib, the remaining rib portion having a center, said center dividing the remaining rib portion longitudinally;

d. sectioning the remaining rib portion longitudinally down the center thereby yielding two spare rib portions from the remaining rib portion; and e. sectioning the two spare rib portions laterally thereby yielding smaller sections of the two spare rib portions.

9. The method of claim 8, further comprising removing the two rib sections on the shoulder end from the remaining rib portion.

10. A method of cutting a spare rib, comprising:

a. taking a spare rib, said spare rib having a brisket portion, a tail portion, and a shoulder end having two rib sections;

b. removing the brisket portion from the spare rib;

c. removing the tail portion from the spare rib thereby yielding a remaining rib portion after the brisket portion and the tail portion have been removed from the spare rib; and d. sectioning the remaining rib portion longitudinally thereby yielding at least two spare rib portions from the remaining rib portion.

11. The method of claim 10, further comprising removing the two rib sections on the shoulder end from the remaining rib portion.

12. The method of claim 10, further comprising sectioning the at least two spare rib portions laterally thereby yielding smaller sections of the at least two spare rib portions.

13. The method of claim 10, wherein the at least two spare rib portions are substantially equal in size.

* * * * *

UNITED STATES PATENT AND TRADEMARK OFFICE
CERTIFICATE OF CORRECTION

PATENT NO.    : 6,527,636 B2
DATED         : March 4, 2003
INVENTOR(S)   : Darrly H. Mickelsen It is certified that error appears in the above-identified patent and that said Letters Patent is hereby corrected as shown below:

Column 5,
Line 2, please delete "Thereby" and insert therefore -- thereby --;
Line 21, please delete "tall" and insert therefore -- tail --;
Lines 23, 29, 34, 43 and 51, please delete "fib" and insert therefore -- rib --;

Column 6,
Line 8, please insert -- , -- after "portion".

Signed and Sealed this

Second Day of September, 2003

JAMES E. ROGAN
*Director of the United States Patent and Trademark Office*